Jan. 14, 1930.     M. D. HELSER     1,743,346
METHOD OF SUSPENDING ANIMALS WHILE BEING DRESSED
Filed Dec. 24, 1928
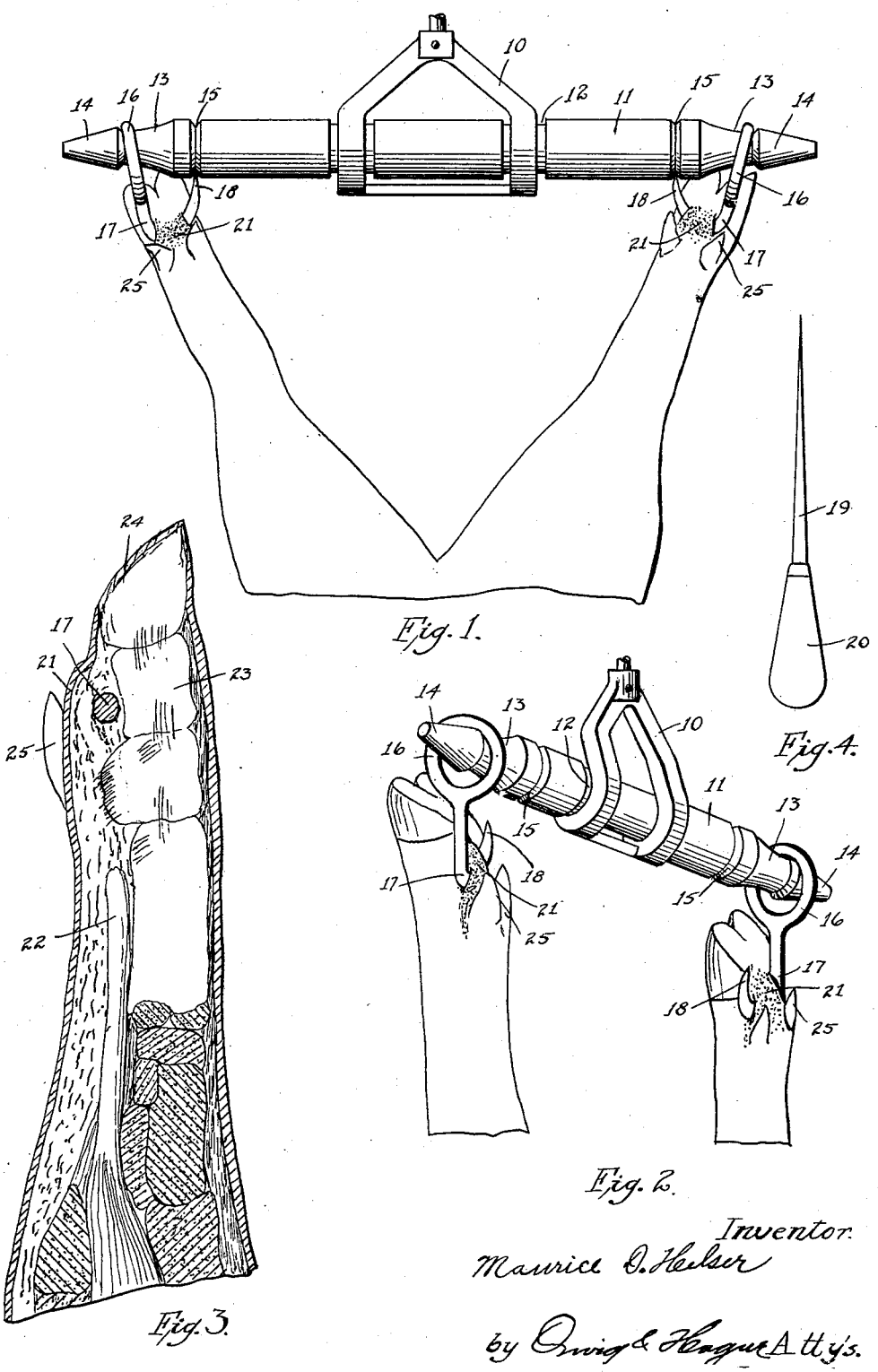

Patented Jan. 14, 1930

1,743,346

UNITED STATES PATENT OFFICE

MAURICE D. HELSER, OF AMES, IOWA

METHOD OF SUSPENDING ANIMALS WHILE BEING DRESSED

Application filed December 24, 1928. Serial No. 328,278.

It is the present practice in the packing industry to suspend the hog carcass while going through the dehairing machine by means of hooks inserted in incisions made in the animal's hind legs between the hock and fetlock joints. It is well known in the packing industry that because of these incisions, and when the carcass is going through the dehairing machine, water and other foreign substances enter these incisions that receive the hooks and make it unfit for human consumption, and it is the practice of the Bureau of Animal Industry to prevent the feet having such incisions from being used as an animal product.

My invention relates to the suspension of swing while being dressed, and particularly to the method of, and means for, supporting the animal so that water and foreign materials from the scalding vat are not permitted to enter the interior of the animal's foot, and thus eliminate one of the chief causes of the hams souring while being cured, and permits the use of the hind feet as an animal product.

A very complete disclosure of the causes of the souring of hams is given in the patent to Boelio, No. 1,271,501, July 2, 1918.

So far as I am aware none of the methods disclosed in said patent have been placed in practical use, other than the method which has been in common use for a large number of years, which consists in making an incision of about three or six inches in length on the posterior surface of the hind leg between the hock and fetlock joints, then placing a gambrel or hook between the flexor tendons, and the leg, which causes the tendons to be drawn outwardly through the said incision and the flesh and skin to be opened, so that a cavity or recess is formed in which water and foreign substances may enter. The animal is suspended by suspending the gambrel or hooks.

Considerable difficulty has been experienced with this method of suspending animals, due to the fact that the operator, in making the incision, often cuts one or both of the flexor tendons or ham strings, which results in the animal being dropped to the floor as it progresses through the various dressing operations.

It is therefore the object of my invention to provide a method and means for carrying out said method, whereby the possibility of water and foreign substances entering the interior of the animal's leg or foot while being dressed, and also the possibility of the animal being dropped while being conveyed through the various stages of dressing, are eliminated.

A further object is to suspend the animal in such a manner that a dehairing machine may operate near the foot and thereby eliminate a large amount of hand work that has heretofore been necessary in dressing the hind legs.

In the accompanying drawings:

Figure 1 shows the manner in which the animal is suspended while being dehaired, according to my improved method.

Figure 2 shows the manner in which the hind legs are supported after the animal has been completely dressed.

Figure 3 is a longitudinal sectional view of the hind foot of an animal showing the position in which the supporting hook is inserted; and Figure 4 is a side elevation of the tool employed for piercing the foot in carrying out my improved method.

The numeral 10 indicates a suspending hook which is of the ordinary construction and is supported by the ordinary conveying mechanism. Supported in the hook 10 is a gambrel 11 which is preferably of cylindrical formation having annular grooves 12 for resting on the hooks 10. The grooves 12 provide means whereby the gambrel will be held against longitudinal movement within said hooks.

Each end of the gambrel 11 is provided with an annular depression 13 to form a knob 14. Each end of the gambrel 11 is also provided with an annular groove 15 near each of the depressions 13. Supported in each of the depressions 13 is an annular hook supporting member 16, of such size as to readily place over the knob 14. The member 16 has a hook 17 having an upwardly and inwardly projecting end portion 18, said end portion 18 being tapered to a comparatively sharp point.

The parts are so proportioned that when the animal is suspended in the manner illustrated in Figure 1, the pointed ends 18 will enter the annular grooves 15 to protect said pointed ends against the beater blades of a dehairing machine, so that said blades may be permitted to operate on the entire surface of the hind leg, and a portion of the foot, around the accessory digits, thus providing means whereby the entire hind legs and a larger portion of the feet may be dehaired.

My method of suspending animals consists in perforating each hind foot 21 transversely and between the flexor tendons 22 and phalanges 23 and between the chief digits 24 and the accessory digits 25, by means of a sharp pointed instrument 19, then placing in the perforations thus formed the hooks 17, and then placing the looped portions of the hooks on the gambrel 11, so that the pointed ends 18 rest within the annular grooves 15.

The instrument 19 is preferably in the form of a tapered rod having an enlarged handle 20. The diameter of the tapered rod should be no greater than the diameter of the hooks 17, so that when said hooks are placed in position, the openings formed by said piercing instrument will be entirely closed. The hooks are designed to fit snugly and thus prevent any water which might surround the hooks and the feet from entering the interior.

It will readily be seen that a great advantage is obtained by this method, over the method now in common practice in which incisions are made in the hind leg between the hock and fetlock joints, in that the entire hind leg may be easily, quickly and mechanically cleaned, and the hind legs preserved in a more desirable and sanitary condition for curing and pickling.

Another advantage of my improved method of suspending animals lies in placing the hooks between the chief and accessory digits. The possibility of any water or foreign substances, that might enter the incisions and pass downwardly into the ham, is greatly eliminated, due to the tight and contracted construction of the foot and leg where the phalanges join the tarsals. The foot and leg are very contracted at this junction and formed largely of bones, ligaments and tendons, which are firmly supported together and in which open passageways or recesses are substantially eliminated.

It will therefore be seen that I have provided a very simple, positive and practical method of suspending swine while being dressed, in which loss, due to spoiled meats on account of the method of suspending, is entirely eliminated, and in which a large portion of the hand work, theretofore necessary in the dressing of the hind legs, has been greatly decreased.

I claim as my invention:

1. The method of suspending animals while being dressed, which consists in piercing each hind foot transversely between the chief and accessory digits, and between the phalanges and the flexor tendons, with a sharp and pointed instrument, then inserting in each of the perforations a hook of such size as to snugly fit said perforations, and then suspending said hooks.

2. The method of suspending animals while being dressed, which consists in piercing each hind foot transversely between the chief and accessory digits, and between the phalanges and the flexor tendons, with a sharp and pointed instrument, then inserting in each of the perforations a hook of such size as to snugly fit said perforations, then mechanically shielding or protecting the protruding ends of said hooks, and then suspending said hooks and the animal supported thereby.

3. The method of suspending animals while being dressed, which consists in piercing one hind foot of the animal transversely between the chief and accessory digits and between the phalanges and the flexor tendons, then inserting a hook in said perforation of a size to snugly fit the perforation, and then suspending the hook and the animal carried thereby.

4. The method of suspending an animal while being dressed, which consists in inserting a sharp pointed hook transversely through the animal's foot between the chief and accessory digits and between the phalanges and flexor tendons, and then suspending said hooks and the animal supported thereby.

5. The method of suspending an animal while being dressed, which consists in inserting a sharp pointed hook transversely through the animal's foot between the chief and accessory digits and between the phalanges and flexor tendons, then mechanically shielding the free end of said hook, and then suspending the hooks and the animal carried thereby.

Des Moines, Iowa, December 7, 1928.

MAURICE D. HELSER.